(12) United States Patent
Fujita

(10) Patent No.: US 10,906,433 B2
(45) Date of Patent: Feb. 2, 2021

(54) VEHICLE SEAT

(71) Applicant: TACHI-S CO., LTD., Tokyo (JP)

(72) Inventor: Daisuke Fujita, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 16 days.

(21) Appl. No.: 16/318,239

(22) PCT Filed: Apr. 3, 2017

(86) PCT No.: PCT/JP2017/013966
§ 371 (c)(1),
(2) Date: Jan. 16, 2019

(87) PCT Pub. No.: WO2018/016134
PCT Pub. Date: Jan. 25, 2018

(65) Prior Publication Data
US 2019/0152353 A1 May 23, 2019

(30) Foreign Application Priority Data

Jul. 21, 2016 (JP) .................. 2016-143461

(51) Int. Cl.
*B60N 2/427* (2006.01)
*B60N 2/02* (2006.01)
(Continued)

(52) U.S. Cl.
CPC .......... *B60N 2/22* (2013.01); *B60N 2/42709* (2013.01); *B60N 2/42745* (2013.01); *B60N 2/68* (2013.01)

(58) Field of Classification Search
CPC .......... B60N 2/682; B60N 2/686; B60N 2/22; B60N 2/68; B60N 2/1615; B60N 2/20
See application file for complete search history.

(56) References Cited

U.S. PATENT DOCUMENTS 4,863,219 A * 9/1989 Ochiai .................. B60N 2/22
297/452.11
5,269,588 A   12/1993 Kunz et al.
(Continued)

FOREIGN PATENT DOCUMENTS

JP   H01-086835 U   6/1989
JP   H01-095139 U   6/1989
(Continued)

OTHER PUBLICATIONS

International Search Report issued in corresponding International Patent Application No. PCT/2017/013966 dated Jun. 20, 2017.

*Primary Examiner* — Shin H Kim
(74) *Attorney, Agent, or Firm* — Morgan, Lewis & Bockius LLP

(57) ABSTRACT

A vehicle seat 1 includes a seat cushion 2 for supporting the buttocks of an occupant, a backrest 3 having a seat back 5 and supporting the back of the occupant, and a reclining mechanism 8 having a bracket 82 that rotates about a rotation axis C and enabling the backrest 3 to rotate relative to the seat cushion 2. The bracket 82 is fastened onto a side surface plate 51 of the seat back 5 by a first bolt 61, a second bolt 62, and a third bolt 63 that pass through the bracket 82 and the side surface plate 51. An insertion position for the third bolt 63 is offset from a straight line L passing through an insertion position for the first bolt 61 and an insertion position for the second bolt 62.

2 Claims, 7 Drawing Sheets

(51) Int. Cl.
*B60N 2/12* (2006.01)
*B60N 2/22* (2006.01)
*B60N 2/68* (2006.01)

(56) References Cited

U.S. PATENT DOCUMENTS

| | | | | |
|---|---|---|---|---|
| 5,722,731 | A * | 3/1998 | Chang | B60N 2/0705 297/344.1 |
| 5,938,265 | A * | 8/1999 | Oyabu | B60N 2/4235 296/68.1 |
| 6,199,953 | B1 * | 3/2001 | Chen | B60N 2/232 297/367 R |
| 6,231,125 | B1 * | 5/2001 | Maeda | A47C 7/282 297/452.56 |
| 6,361,114 | B1 * | 3/2002 | Rumler | A47C 7/543 297/411.39 |
| 6,682,146 | B2 * | 1/2004 | Minai | B60N 2/06 297/216.15 |
| 9,016,791 | B2 * | 4/2015 | Flucht | B60N 2/206 297/378.1 |
| 9,376,044 | B2 * | 6/2016 | Fujita | B60N 2/68 |
| 9,649,961 | B2 * | 5/2017 | Ter Steeg | B32B 15/18 |
| 10,023,087 | B2 * | 7/2018 | Tamura | B60N 2/682 |
| 10,214,117 | B2 * | 2/2019 | Tanaka | B60N 2/0232 |
| 10,322,655 | B2 * | 6/2019 | Ter Steeg | B29C 70/30 |
| 10,518,663 | B1 * | 12/2019 | Kakishima | B60N 2/12 |
| 2003/0098601 | A1 * | 5/2003 | Minai | B60N 2/06 297/452.19 |
| 2006/0103223 | A1 * | 5/2006 | Nagayama | A47C 7/40 297/452.18 |
| 2007/0029860 | A1 * | 2/2007 | Yamada | B60N 2/22 297/440.21 |
| 2009/0115217 | A1 * | 5/2009 | Tanaka | B60N 2/0232 296/65.09 |
| 2013/0099532 | A1 * | 4/2013 | Izumida | B60N 2/22 297/216.14 |
| 2013/0307301 | A1 * | 11/2013 | Munemura | B60N 2/4228 297/216.13 |
| 2014/0110985 | A1 * | 4/2014 | Yamaguchi | B60N 2/68 297/354.1 |
| 2014/0339873 | A1 * | 11/2014 | Cerruti | B60N 2/1615 297/344.13 |
| 2015/0203011 | A1 | 7/2015 | Fujita et al. | |
| 2016/0096461 | A1 | 4/2016 | Coppuck | |
| 2018/0037138 | A1 * | 2/2018 | Tanaka | B60N 2/0232 |
| 2019/0070990 | A1 * | 3/2019 | Ohmori | B60N 2/22 |
| 2019/0152353 | A1 * | 5/2019 | Fujita | B60N 2/68 |
| 2019/0184866 | A1 * | 6/2019 | Tamaki | B60N 2/22 |

FOREIGN PATENT DOCUMENTS

| | | |
|---|---|---|
| JP | H04-046850 U | 4/1992 |
| JP | H04-212640 A | 8/1992 |
| JP | H04-241811 A | 8/1992 |
| JP | 2013-237415 A | 11/2013 |
| WO | 2014/027627 A | 2/2014 |
| WO | 2014/207147 A1 | 12/2014 |

* cited by examiner

VEHICLE SEAT

TECHNICAL FIELD

The present application relates to a vehicle seat for seating a vehicle occupant.

BACKGROUND ART

Vehicle seats capable of changing the angle of the backrest relative to the seat cushion (hereafter referred to as a "reclining angle") are widely used. By changing the reclining angle, the form of a seat can be adjusted to fit with the body build of a vehicle occupant.

Patent Document 1 discloses a seat back provided to the backrest of such a seat. The seat back is fixed, at a side surface part thereof, onto a reclining mechanism. More specifically, the side surface part of the seat back and a bracket (upper arm) of the reclining mechanism are fastened by two bolts that pass through both the side surface part and the bracket. By rotating the bracket about a predetermined axis, the backrest can be tilted backward and forward to change the reclining angle.

CITATION LIST

Patent Document

Patent Document 1: Patent Publication JP-A-2013-237415

SUMMARY

Technical Problem

The seat back disclosed in Patent Document 1 receives a reaction force from the bolts when a force acts on the backrest in a vehicle collision, or the like. More specifically, when a force acts on the backrest, a moment acts about one of the bolts, and the seat back receives, in a hole that allows the other of the bolts to pass therethrough, a reaction force that counters the moment. The seat back, which is formed of a resin material to reduce the weight of the seat, may be damaged by the reaction force. For this reason, the seat back is provided with a large number of ribs to reinforce the vicinity of the holes. However, the reinforcement by means of ribs results in unwelcome increase in the weight and increase in processing costs for a mold for forming the seat back.

As another solution, it is also practicable to increase the number of bolts for fastening between the bracket and the seat back to prevent concentration of the reaction force as received from the bolts. However, simply increasing the number of bolts needs increase in the size of the bracket to allow those bolts to pass therethrough, causing unwelcome increase in the weight, after all.

The present invention has been made with the foregoing in view, and it is an object of the present invention to provide a vehicle seat capable of suppressing damage of the seat back due to a force acting on the backrest while suppressing increase in the weight.

Solution to Problem

In order to solve the problem, a vehicle seat according to the present invention includes: a seat cushion for supporting buttocks of an occupant; a backrest having a seat back and supporting a back of the occupant; and a reclining mechanism having a bracket that rotates about a rotation axis, and enabling the backrest to rotate relative to the seat cushion. The bracket is fastened onto a side surface part of the seat back by a first bolt, a second bolt, and a third bolt that pass through the bracket and the side surface part. An insertion position for the third bolt is offset from a straight line passing through an insertion position for the first bolt and an insertion position for the second bolt.

In this configuration, even if a force has acted on the backrest, and a moment has consequently acted about the insertion position for one of the first bolt, the second bolt, and the third bolt, the seat back receives, in the insertion positions for the other two bolts, reaction forces that counter the moment. That is to say, this configuration prevents concentration of the reaction force that the seat back receives from the bolts, and thus suppresses damage of the seat back.

In addition, the insertion position for the third bolt is offset from the straight line passing through the insertion position for the first bolt and the insertion position for the second bolt. This configuration enables concentration of the insertion positions for the bolts into a narrow area in comparison to a configuration in which the insertion position for the third bolt is disposed on the straight line. This renders the bracket of the reclining mechanism compact, and thus suppresses increase in the weight.

In addition, the insertion position for the first bolt, the insertion position for the second bolt, and the insertion position for the third bolt may be located at the apexes of the triangle that does not have an obtuse angle. This configuration enables concentration of the insertion positions for the bolts into a further narrow area in comparison to a configuration in which the insertion position for the first bolt, the insertion position for the second bolt, and the insertion position for the third bolt are disposed at the apexes of a triangle having an obtuse angle. This renders the bracket of the reclining mechanism compact, and thus suppresses increase in the weight, while preventing concentration of the reaction force that the seat back receives from the bolts.

In addition, the insertion position for the first bolt and the insertion position for the second bolt may be substantially equal in distance from the rotation axis, and the insertion position for the third bolt may be farther apart from the rotation axis than the insertion position for the first bolt and the insertion position for the second bolt. This configuration enables the bracket to be formed such that the bracket has a narrow width in an area from the vicinity of the insertion positions for the first bolt and the second bolt to the insertion position of the third bolt. This renders the bracket of the reclining mechanism compact, and thus suppresses increase in the weight, while preventing concentration of the reaction force that the seat back receives from the bolts.

Advantageous Effects of Invention

The present invention provides a vehicle seat capable of suppressing damage of the seat back due to a force acting on the backrest, while suppressing the increase in the weight.

DESCRIPTION OF EMBODIMENTS

An embodiment of the present invention is now described with reference to the attached drawings. For effortless understanding of the description, identical constituent elements are, to the extent possible, assigned identical reference signs over the drawings, and redundant explanation is omitted.

Figure 1:
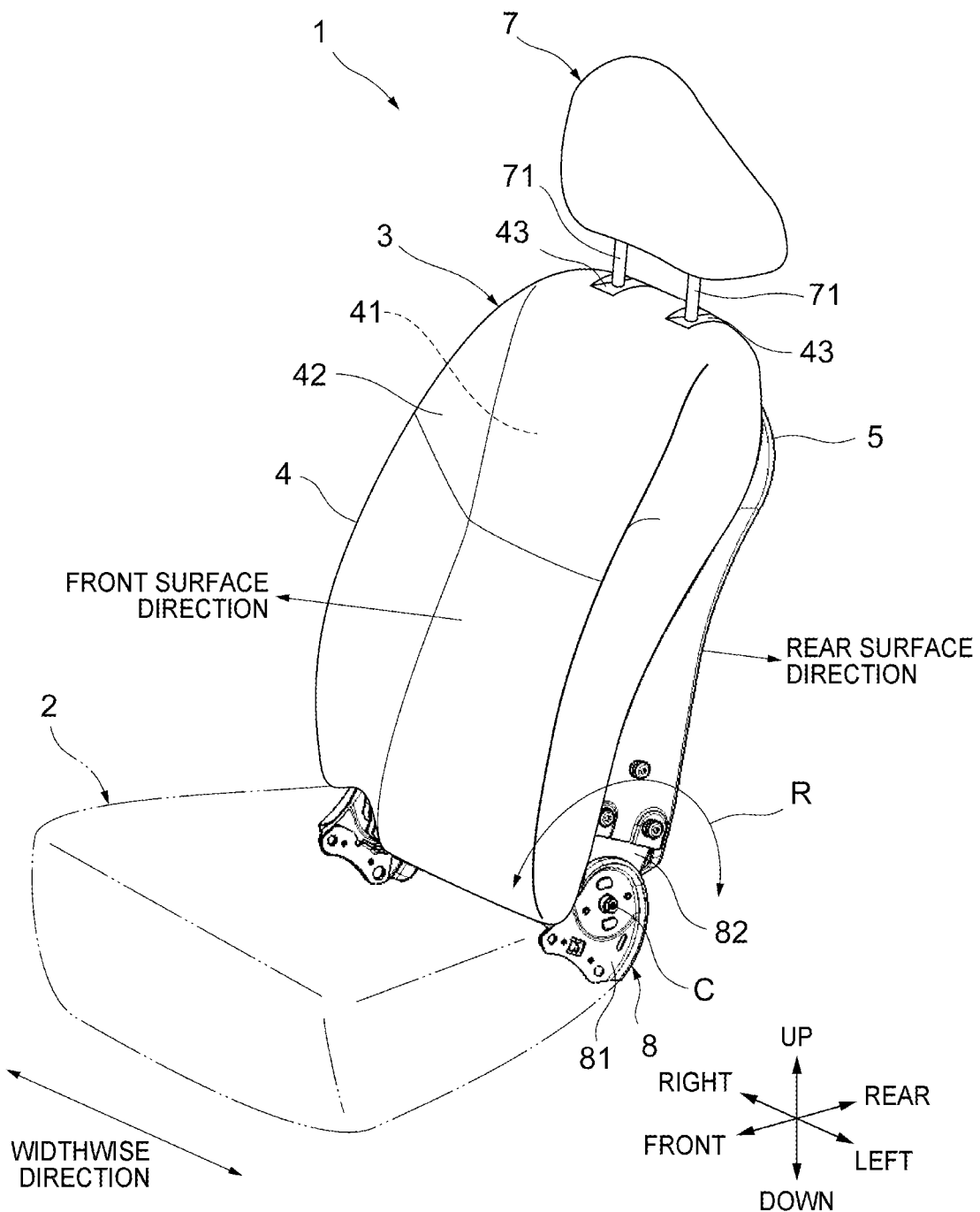
FIG. 1 is a perspective view showing a vehicle seat according to an embodiment.

First, a vehicle seat 1 (hereafter simply referred to as a "seat 1") according to the embodiment is described with reference to FIG. 1. The seat 1 is mounted onto a vehicle, not shown, and used for seating an occupant. FIG. 1, which is a perspective view showing the seat 1, shows the state of the seat 1 as seen from the front.

It is noted that directions in the present description are indicated on the basis of the condition where the seat 1 is mounted on the vehicle. That is to say, the direction in which the vehicle travel forward is referred to as "front", and the direction backward, as "rear". Further, the left direction in the condition where the vehicle heads for the forward traveling direction is referred to as "left", and the right direction, as "right". Further, the upward vertical direction is referred to as "up", and the downward vertical direction, as "down".

The seat 1 includes a seat cushion 2, a backrest 3, a headrest 7, and a reclining mechanism 8.

The seat cushion 2 is a part for supporting the buttocks of the seated occupant from below. The outer shape of the seat cushion 2 is formed by a cushion not shown. The cushion is formed of a material having elasticity, such as a urethane foam. The surface of the cushion is covered by a surface material of a chemical fiber fabric.

The backrest 3 is a part for supporting the back of the seated occupant from behind. The backrest 3 has a seat cover 4 and a seat back 5, and is disposed toward a rear end of and above the seat cushion 2.

It is noted that, in the state of the backrest 3 as shown in FIG. 1, a front-side surface of the backrest 3 is referred to as "front surface", and a back-side surface of the backrest 3, as "rear surface". In addition, the direction toward the front surface from the rear surface is referred to as "front surface direction", and the direction opposite to the front surface direction, as "rear surface direction". Furthermore, the lateral direction, which is a direction intersecting with the front surface direction and the rear surface direction, is referred to as "widthwise direction".

The seat cover 4 is a part that forms the front surface of the backrest 3. The seat cover 4 has a seat pad 41 composed of a urethane foam, and a surface material 42 covering the surface of the seat pad 41. In an end (the upper end in the state as shown in FIG. 1) of the seat cover 4, two through holes 43 are formed. The seat cover 4 is attached onto the seat back 5 by fitting the seat pad 41 into a space formed by a pair of side surface plates 51 and an upper surface plate 54, described later, of the seat back 5.

The seat back 5 is a part that forms the rear surface of the backrest 3. The seat back 5 is formed of a resin containing an elastic fiber. The fiber exerts the effect of enhancing the rigidity of the seat back 5, and a glass fiber or a carbon fiber, for example, can be used as this fiber. In addition, a nylon, for example, can be used as the resin.

The headrest 7 is a part for supporting the head of the seated occupant from behind. The headrest 7 is fixed onto an end (the upper end in the state as shown in FIG. 1) of the backrest 3. The headrest 7 has two rods 71. The rods 71 are bar-shaped members made of a metal. The headrest 7 is fixed onto the seat back 5 by inserting the rods 71 into the through holes 43 of the seat cover 4.

The reclining mechanism 8 is a mechanism connecting between the seat cushion 2 and the backrest 3. The reclining mechanism 8 has bases 81 and brackets 82. The brackets 82 are in a plate shape, and are configured to be capable of rotating about a rotation axis C. The bases 81 are fixed onto the seat cushion 2, and the brackets 82 are fixed onto the other end (the lower end in the state as shown in FIG. 1) of the seat back 5. Thus, the backrest 3 is configured to be capable of rotating about the rotation axis C in the direction indicated with the arrow R to change the reclining angle.

Figure 2:
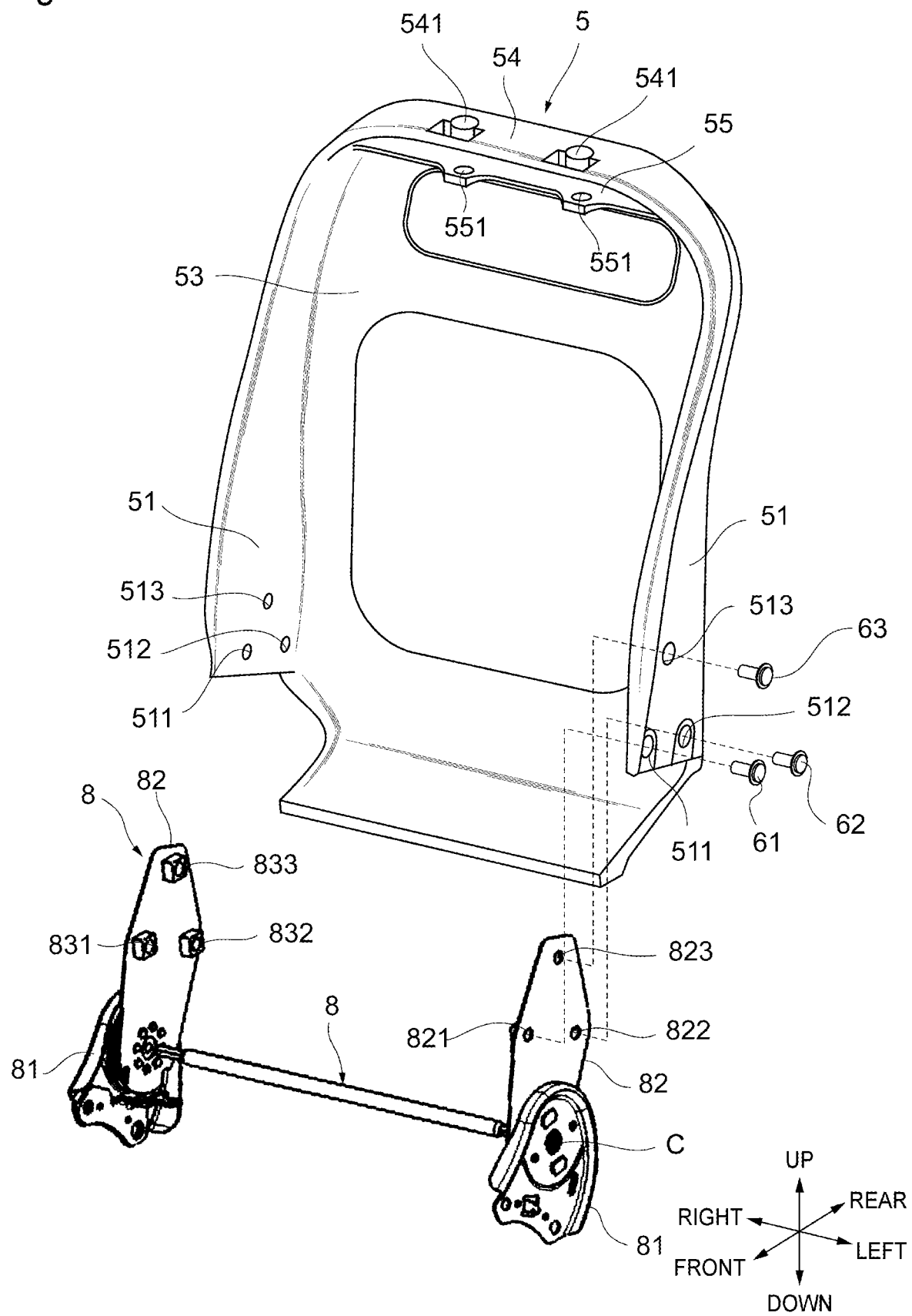
FIG. 2 is a perspective view showing a seat back and a reclining mechanism in FIG. 1.
Figure 3:
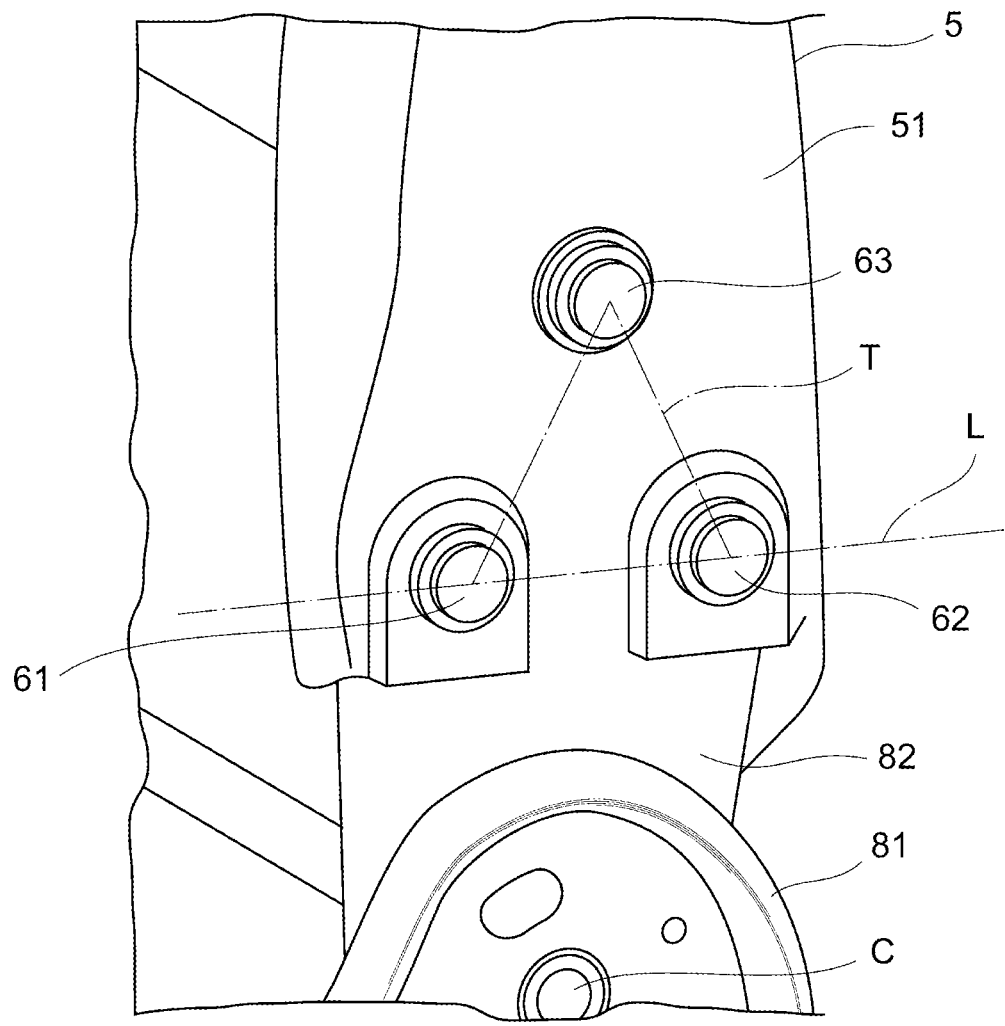
FIG. 3 is an enlarged view showing the vicinity of bolts in FIG. 1.
Figure 3:
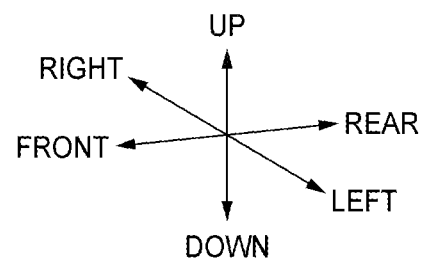

Next, the configurations of the seat back 5 and the reclining mechanism 8 are described in detail with reference to FIG. 2 and FIG. 3. FIG. 2, which is a perspective view of the seat back 5 and the reclining mechanism 8 as seen from the front, shows the seat back 5 and the reclining mechanism 8 in a disassembled state. FIG. 3 is an enlarged view showing the vicinity of a first bolt 61, a second bolt 62, and a third bolt 63, described later. FIG. 3 illustrates the first bolt 61, the second bolt 62, and the third bolt 63 that fasten between the side surface plate 51 and the bracket 82 on the left side.

As shown in FIG. 2, the seat back 5 has the side surface plates 51, a rear surface plate 53, and the upper surface plate 54, and a fixation plate 55.

The side surface plates 51 are provided in pair on the both ends of the rear surface plate 53 in the widthwise direction, and extend toward the front surface direction from the rear surface plate 53. That is to say, the paired side surface plates 51 are plate parts formed to face each other in the widthwise direction with a distance therebetween. In an end (the lower end in the state as shown in FIG. 2) of each side surface plate 51, a first through hole 511, a second through hole 512, and a third through hole 513 are formed. The first through hole 511, the second through hole 512, and the third through hole 513 all are provided through the side surface plate 51 in the thickness direction (i.e., the widthwise direction), and are formed by a circumferential side surface in an annular shape.

The upper surface plate 54 extends in the front surface direction from an end (the upper end in the state as shown in FIG. 2) of the rear surface plate 53. The both ends of the upper surface plate 54 in the widthwise direction are respectively connected to ends of the side surface plates 51. In the upper surface plate 54, two through holes 541 are formed with a distance therebetween in the widthwise direction.

The fixation plate 55 extends in the front surface direction from the rear surface plate 53. The fixation plate 55 is substantially parallel to the upper surface plate 54. The both ends of the fixation plate 55 in the widthwise direction are respectively connected to the side surface plates 51. In the fixation plate 55, two through holes 551 are formed with a distance therebetween in the widthwise direction. The through holes 551 are formed at positions corresponding to the through holes 541 of the upper surface plate 54.

As seen, in the seat back 5, the paired side surface plates 51 and the upper surface plate 54 surround an front surface-side end surface of the rear surface plate 53 to form a space that is open on the front-surface side. As described above, the seat cover 4 is attached onto the seat back 5 by fitting the seat pad 41 into the space. In addition, the headrest 7 is fixed onto the seat back 5 by making the two rods 71 pass through the through holes 541 of the upper surface plate 54 (refer to FIG. 1) and the through holes 551 of the fixation plate 55.

The brackets 82 of the reclining mechanism 8 are provided in pair to face each other in the widthwise direction with a distance therebetween. In each bracket 82, a first through hole 821, a second through hole 822, and a third through hole 823 are formed. The first through hole 821, the second through hole 822, and the third through hole 823 all are provided through the bracket 82 in the thickness direction (i.e., the widthwise direction). A first nut 831, a second nut 832, and a third nut 833 each having a female screw thread are provided at positions, in the bracket 82, which correspond to the first through hole 821, the second through hole 822, and the third through hole 823.

Each bracket 82 is fastened onto the side surface plate 51 of the seat back 5 by the first bolt 61, the second bolt 62, and the third bolt 63 that have a male screw. FIG. 2 illustrates the first bolt 61, the second bolt 62, and the third bolt 63 that fasten between the side surface plate 51 and the bracket 82 on the left side alone, and those on the right side are omitted in the figure. The first bolt 61 passes through the first through hole 511 of the seat back 5 and the first through hole 821 of the bracket 82 to screw with the first nut 831. In a similar manner, the second bolt 62 passes through the second through hole 512 of the seat back 5 and the second through hole 822 of the bracket 82 to screw with the second nut 832. Furthermore, the third bolt 63 passes through the third through hole 513 of the seat back 5 and the third through hole 823 of the bracket 82 to screw with the third nut 833.

As shown in FIG. 3, insertion positions for the first bolt 61, the second bolt 62, and the third bolt 63 in the bracket 82 and the side surface plate 51 of the seat back 5 are disposed a distance apart from one another. Specifically, in a side view, supposing that a straight line passing through the insertion position for the first bolt 61 and the insertion position for the second bolt 62 is called straight line L, the insertion position for the third bolt 63 is offset from the straight line L. In other words, the insertion position for the first bolt, the insertion position for the second bolt, and the insertion position for the third bolt as seen in a side view are not located on an identical straight line. The insertion position for the first bolt 61, the insertion position for the second bolt 62, and the insertion position for the third bolt 63 are located at apexes of a triangle T. The triangle T is a substantially equilateral triangle. That is to say, the triangle T does not have an obtuse angle.

In addition, the insertion position for the first bolt 61 and the insertion position for the second bolt 62 are substantially equal in distance from the rotation axis C. Furthermore, the insertion position for the third bolt 63 is farther apart from the rotation axis C than the insertion position for the first bolt 61 and the insertion position for the second bolt 62.

Figure 4:
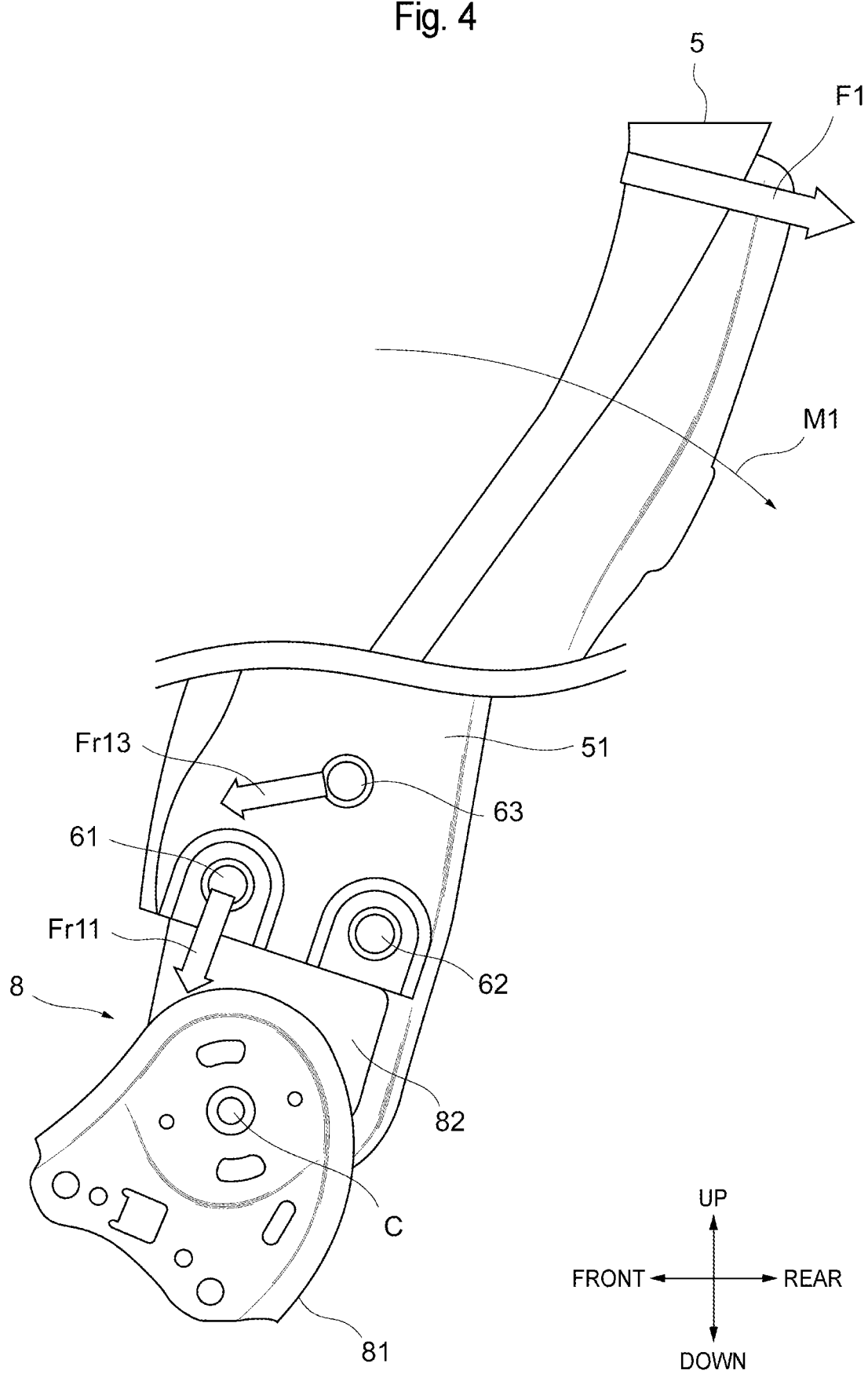
FIG. 4 is a side view showing the seat back and the reclining mechanism in a case where a force has acted in the rear surface direction.
Figure 5:
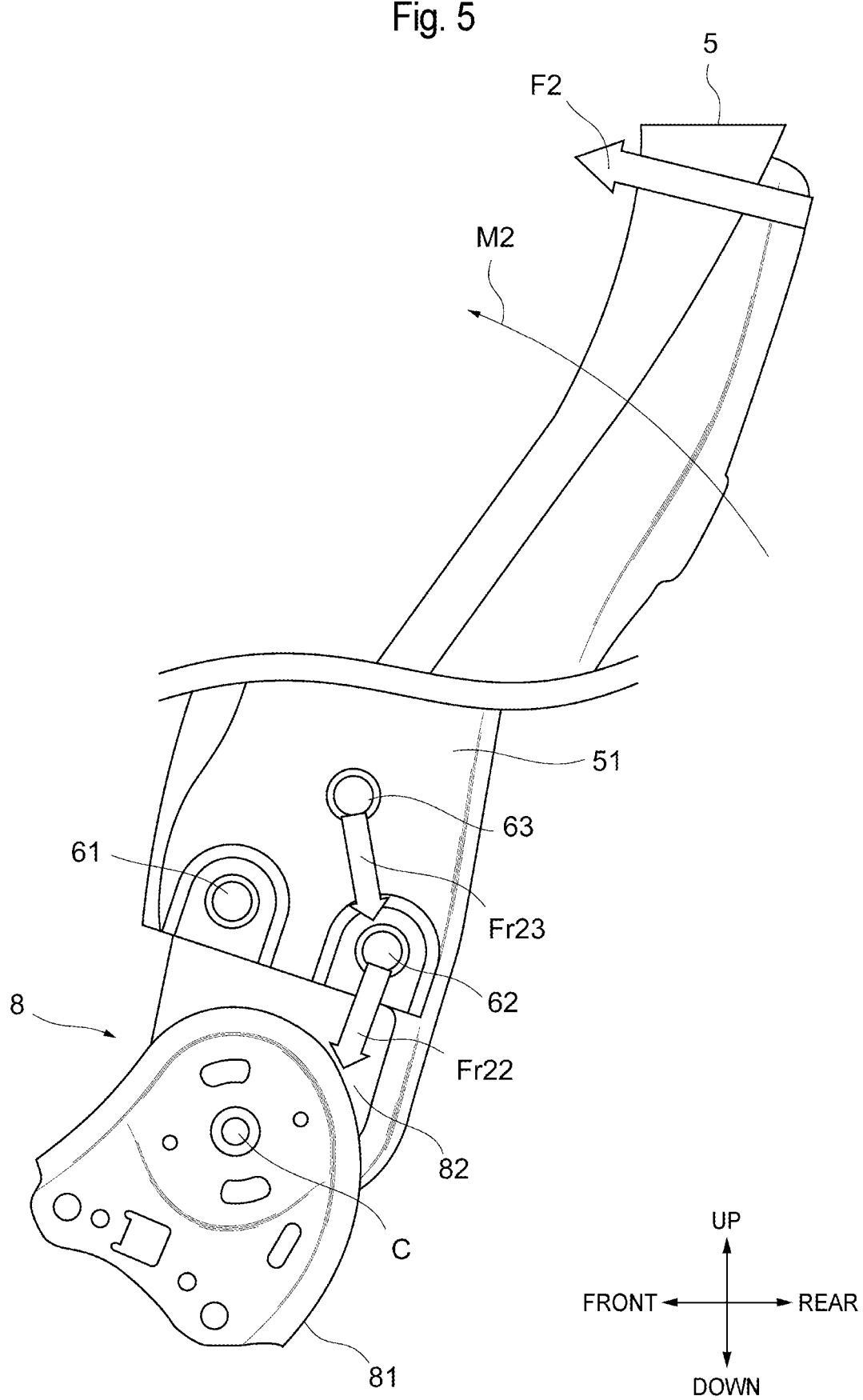
FIG. 5 is a side view showing the seat back and the reclining mechanism in a case where a force has acted in the front surface direction.

Next, with reference to FIG. 4 and FIG. 5, explanation is given about reaction forces that the seat back 5 receives from the first bolt 61, the second bolt 62, and the third bolt 63 in a case where a force has acted on the backrest 3 of the seat 1 configured in the manner as described above. FIG. 4 is a side view showing the seat back 5 and the reclining mechanism 8 in a case where a force has acted in the rear surface direction. FIG. 5 is a side view showing the seat back 5 and the reclining mechanism 8 in a case where a force has acted in the front surface direction.

For example, in a case where the vehicle with the seat 1 mounted thereon has been crashed from behind by another vehicle (i.e., in the case of what is called a rear-end collision), a force in the rear surface direction acts on the backrest 3 due to the inertia of the backrest 3 per se, or the inertia of the occupant that leans on the backrest 3. As a result, the force in the rear surface direction also acts on the seat back 5, as indicated with the arrow F1 in FIG. 4.

When such a force in the rear surface direction has acted on the seat back 5, a moment acts about the insertion position for any one of the first bolt 61, the second bolt 62, and the third bolt 63. Here, suppose that a moment indicated with the arrow M1 has occurred about the insertion position for the second bolt 62 due to the force indicated with the arrow F1 that has acted on the seat back 5.

In this case, the seat back 5 resists the moment by means of reaction forces received from the first bolt 61 and the third bolt 63. More specifically, the seat back 5 receives, in the circumferential side surface of the first through hole 511, a reaction force indicated with the arrow Fr11 from the first bolt 61. The seat back 5 further receives, in the circumferential side surface of the third through hole 513, a reaction force indicated with the arrow Fr13 from the third bolt 63. These reaction forces generate a moment in the direction opposite to the moment indicated with the arrow M1.

Meanwhile, for example, in a case where the vehicle with the seat 1 mounted thereon has been crashed from the front by another vehicle (i.e., in the case of what is called a head-on collision), a force in the front surface direction acts on the backrest 3 due to the inertia of the backrest 3 per se. Alternatively, in a case where an end of a seatbelt not shown is fixed onto the backrest 3, in addition to the force caused by the inertial of the backrest 3 per se, a force caused by the inertia of the occupant acts on the backrest 3 via the seatbelt. As a result, the force in the front surface direction also acts on the seat back 5, as indicated with the arrow F2 in FIG. 5.

When such a force in the front surface direction has acted on the seat back 5, as well, a moment acts about the insertion position for any one of the first bolt 61, the second bolt 62, and the third bolt 63. Here, suppose that a moment indicated with the arrow M2 has occurred about the insertion position for the first bolt 61 due to the force indicated with the arrow F2 that has acted on the seat back 5.

In this case, the seat back 5 resists the moment by means of reaction forces received from the second bolt 62 and the third bolt 63. More specifically, the seat back 5 receives, in the circumferential side surface of the second through hole 512, a reaction force indicated with the arrow Fr22 from the second bolt 62. The seat back 5 further receives, in the circumferential side surface of the third through hole 513, a reaction force indicated with the arrow Fr23 from the third bolt 63. These reaction forces generate a moment in the direction opposite to the moment indicated with the arrow M2.

In the seat 1 having such a configuration, even if a force has acted on the backrest 3, and a moment has consequently acted about the insertion position for one of the first bolt 61, the second bolt 62, and the third bolt 63, the seat back 5 receives, in the insertion positions for the other two bolts, reaction forces that counter the moment. That is to say, this configuration prevents concentration of the reaction force that the seat back 5 receives from the bolts, and thus suppresses damage of the seat back 5.

In addition, the insertion position for the third bolt 63 is offset from the straight line L passing through the insertion position for the first bolt 61 and the insertion position for the second bolt 62. This configuration enables concentration of the insertion positions for the bolts into a narrow area in comparison to a configuration in which the insertion position for the third bolt 63 is disposed on the straight line L. This renders the bracket 82 of the reclining mechanism 8 compact, and thus suppresses increase in the weight.

In addition, the insertion position for the first bolt 61, the insertion position for the second bolt 62, and the insertion position for the third bolt 63 are located at the apexes of the triangle T that does not have an obtuse angle. This configuration enables concentration of the insertion positions for the bolts into a further narrow area in comparison to a configuration in which the insertion position for the first bolt 61, the insertion position for the second bolt 62, and the insertion position for the third bolt 63 are disposed at the apexes of a triangle having an obtuse angle. This renders the bracket 82 of the reclining mechanism 8 compact, and thus suppresses increase in the weight, while preventing concentration of the reaction force that the seat back 5 receives from the bolts.

In addition, the insertion position for the first bolt 61 and the insertion position for the second bolt 62 are substantially equal in distance from the rotation axis C, and the insertion position for the third bolt 63 is farther apart from the rotation axis C than the insertion position for the first bolt 61 and the insertion position for the second bolt 62. This configuration enables the bracket 82 to be formed such that the bracket 82 has a narrow width in an area from the vicinity of the insertion positions for the first bolt 61 and the second bolt 62 to the insertion position of the third bolt 63. This renders the bracket 82 of the reclining mechanism 8 compact, and thus suppresses increase in the weight, while preventing concentration of the reaction force that the seat back 5 receives from the bolts.

Figure 6:
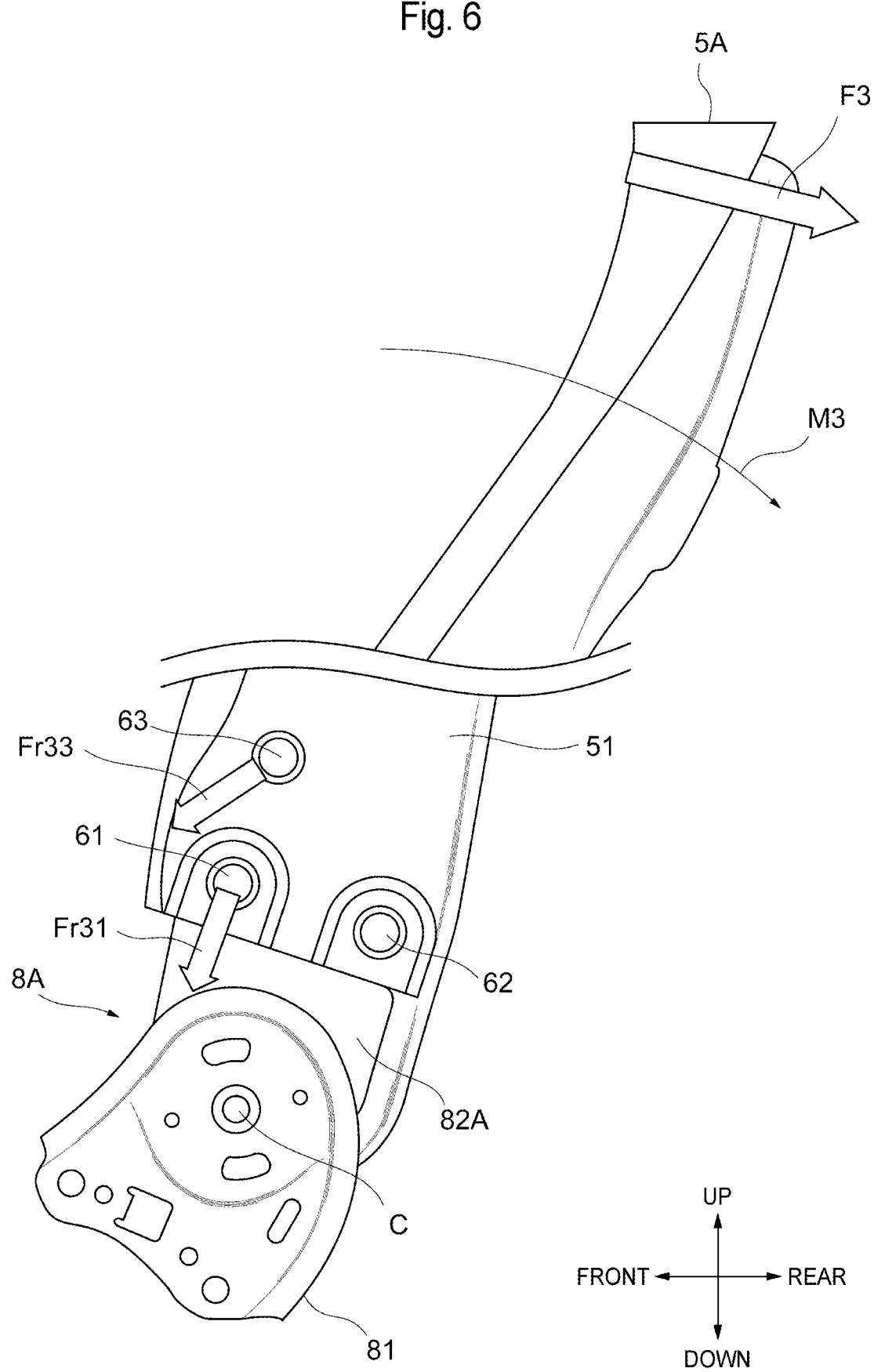
FIG. 6 is a side view showing a seat back and a reclining mechanism according to a first modification example.

Next, a seat back 5A and a reclining mechanism 8A according to a first modification example are described with reference to FIG. 6. FIG. 6 is a side view showing the seat back 5A and the reclining mechanism 8A according to the first modification example. Among the constituent elements in the first modification example, identical elements to those in the above embodiment are assigned identical reference signs, and explanation is omitted as appropriate.

The first modification example is configured to intensively cope with a rear-end collision. Specifically, in the first modification example, the insertion position of a third bolt 63 is provided toward the front-surface side in comparison to that in the above embodiment. That is to say, through holes, not shown, in the seat back 5A and the bracket 82A that allow the third bolt 63 to pass therethrough are formed toward the front-surface side in comparison to the third through hole 513 and the third through hole 823 in the embodiment. This locates the insertion position for a first bolt 61, the insertion position for a second bolt 62, and the insertion position for the third bolt 63 at the apexes of a right triangle.

In a case where a vehicle has collided with another vehicle at the rear-end, a force in the rear surface direction acts on the seat back 5A, as indicated with the arrow F3. At this time, a moment, as indicated with the arrow M3, occurs about the insertion position for the second bolt 62.

In this case, the seat back 5A resists the moment by means of reaction forces received from the first bolt 61 and the third bolt 63. More specifically, the seat back 5A receives, in the circumferential side surface of a through hole that allows the first bolt 61 to pass therethrough, a reaction force indicated with the arrow Fr31 from the first bolt 61. The seat back 5 further receives, in the circumferential side surface of a through hole that allows the third bolt 63 to pass therethrough, a reaction force indicated with the arrow Fr33 from the third bolt 63. These reaction forces generate a moment in the direction opposite to the moment indicated with the arrow M3.

As mentioned, the insertion position for the third bolt 63 in the first modification example is provided toward the front-surface side in comparison to that in the embodiment. That is to say, the distance from the insertion position for the second bolt 62 to the insertion position for the third bolt 63 in the first modification example is greater than that in the embodiment. Accordingly, in a case where a moment about the insertion position for the second bolt 62 is generated by a reaction force received from the third bolt 63, the reaction force enables to be easily decreased in the first modification example than in the embodiment. This reliably suppresses damage of the seat back 5A even if a force in the rear surface direction has acted on the seat back 5A.

Figure 7:
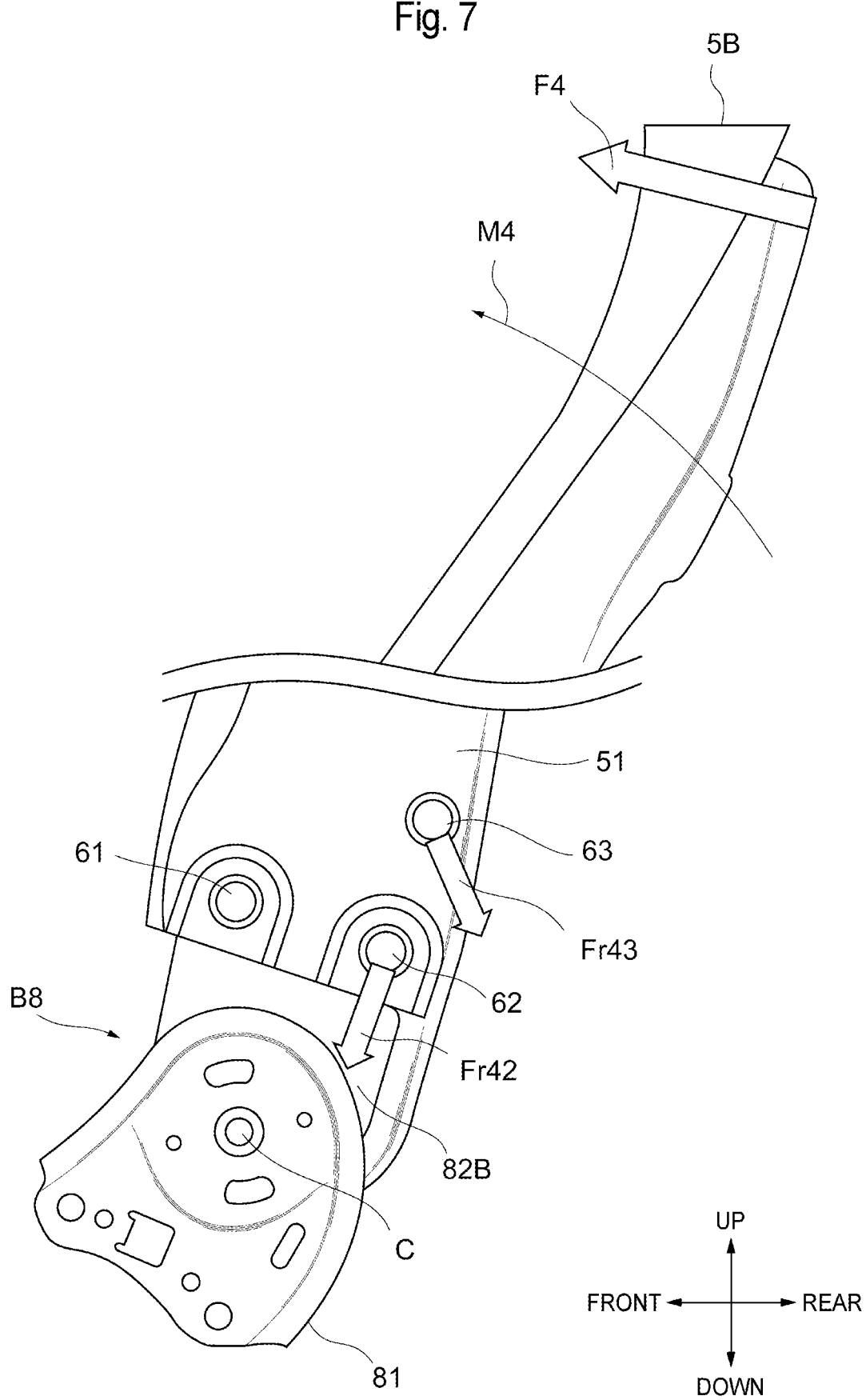
FIG. 7 is a side view showing a seat back and a reclining mechanism according to a second modification example.

Next, a seat back 5B and a reclining mechanism 8B according to a second modification example are described with reference to FIG. 7. FIG. 7 is a side view showing the seat back 5B and the reclining mechanism 8B according to the second modification example. Among the constituent elements in the second modification example, identical elements to those in the embodiment are assigned identical reference signs, and explanation is omitted as appropriate.

The second modification example is configured to intensively cope with a head-on collision. Specifically, in the second modification example, the insertion position of a third bolt 63 is provided toward the rear-surface side in comparison to that in the embodiment. That is to say, through holes, not shown, in the seat back 5B and bracket 82B that allow the third bolt 63 to pass therethrough are formed toward the rear-surface side in comparison to the third through hole 513 and the third through hole 823 in the embodiment. This locates the insertion position for a first bolt 61, the insertion position for a second bolt 62, and the insertion position for the third bolt 63 at the apexes of a right triangle.

In a case where a vehicle has collided head-on with another vehicle, a force in the front surface direction acts on the seat back 5B, as indicated with the arrow F4. At this time, a moment, as indicated with the arrow M4, occurs about the insertion position for the first bolt 61.

In this case, the seat back 5B resists the moment by means of reaction forces received from the second bolt 62 and the third bolt 63. More specifically, the seat back 5B receives, in the circumferential side surface of a through hole that allows the second bolt 62 to pass therethrough, a reaction force indicated with the arrow Fr42 from the second bolt 62. The seat back 5 further receives, in the circumferential side surface of the through hole that allows the third bolt 63 to pass therethrough, a reaction force indicated with the arrow Fr43 from the third bolt 63. These reaction forces generate a moment in the direction opposite to the moment indicated with the arrow M4.

As mentioned, the insertion position for the third bolt 63 in the second modification example is provided toward the rear-surface side in comparison to that in the embodiment. That is to say, the distance from the insertion position for the first bolt 61 to the insertion position for the third bolt 63 in the second modification example is greater than that in the embodiment. Accordingly, in the case where a moment about the insertion position for the first bolt 61 is generated by a reaction force received from the third bolt 63, the reaction force enables to be easily decreased in the second modification example than in the embodiment. This reliably suppresses damage of the seat back 5B even if a force in the front surface direction has acted on the seat back 5B.

The embodiment of the present invention has been described while referring to the specific examples. The present invention, however, is not limited to these specific examples. That is to say, even if design modification has been added to these specific examples, any resultant example that includes the characteristics of the present invention is included in the scope of the present invention. Elements and their locations, materials, conditions, shapes, and sizes included in the specific examples are not limited to those shown in the examples, and can be modified as appropriate.

REFERENCE SIGNS LIST

1 Vehicle seat
2 Seat cushion
3 Backrest
5, 5A, 5B Seat back
51 Side surface plate (side surface part)
61 First bolt
62 Second bolt
63 Third bolt
8, 8A, 8B Reclining mechanism
82, 82A, 82B Bracket
L Straight line
T Triangle

What is claimed is:

1. A vehicle seat for seating a vehicle occupant, the vehicle seat comprising:
    a seat cushion for supporting buttocks of the occupant;
    a backrest having a seat back that is formed of a resin, and supporting a back of the occupant; and
    a reclining mechanism having a bracket that rotates about a rotation axis, and enabling the backrest to rotate relative to the seat cushion,
    wherein the bracket is fastened onto a side surface part of the seat back by a first bolt, a second bolt, and a third bolt that pass through the bracket and the side surface part,
    an insertion position for the third bolt is offset from a straight line passing through an insertion position for the first bolt and an insertion position for the second bolt,
    the insertion position for the first bolt and the insertion position for the second bolt are substantially equal in distance from the rotation axis,
    the insertion position for the third bolt is farther apart from the rotation axis than the insertion position for the first bolt and the insertion position for the second bolt,
    the insertion position for the third bolt is biased, in a direction along the straight line, toward one of the insertion position for the first bolt and the insertion position for the second bolt,
    the insertion position for the first bolt, the insertion position for the second bolt, and the insertion position for the third bolt are located at apexes of a triangle that does not have an obtuse angle,
    the triangle is a right triangle, and
    the insertion position for the third bolt is provided on a front-surface side of the bracket.

2. A vehicle seat for seating a vehicle occupant, the vehicle seat comprising:
    a seat cushion for supporting buttocks of the occupant;
    a backrest having a seat back that is formed of a resin, and supporting a back of the occupant; and
    a reclining mechanism having a bracket that rotates about a rotation axis, and enabling the backrest to rotate relative to the seat cushion,
    wherein the bracket is fastened onto a side surface part of the seat back by a first bolt, a second bolt, and a third bolt that pass through the bracket and the side surface part,
    an insertion position for the third bolt is offset from a straight line passing through an insertion position for the first bolt and an insertion position for the second bolt,
    the insertion position for the first bolt and the insertion position for the second bolt are substantially equal in distance from the rotation axis,
    the insertion position for the third bolt is farther apart from the rotation axis than the insertion position for the first bolt and the insertion position for the second bolt,
    the insertion position for the third bolt is biased, in a direction along the straight line, toward one of the insertion position for the first bolt and the insertion position for the second bolt,
    the insertion position for the first bolt, the insertion position for the second bolt, and the insertion position for the third bolt are located at apexes of a triangle that does not have an obtuse angle,
    the triangle is a right triangle, and
    the insertion position for the third bolt is provided on a rear-surface side of the bracket.

* * * * *